United States Patent
Ghorbel et al.

(10) Patent No.: US 7,210,364 B2
(45) Date of Patent: May 1, 2007

(54) AUTONOMOUS ROBOTIC CRAWLER FOR IN-PIPE INSPECTION

(76) Inventors: Fathi Hassan Ghorbel, 2990 Bissonnet St., Apt. 11308, Houston, TX (US) 77005; James Bruster Dabney, 1003 Valley Acres, Houston, TX (US) 77062; J. Ryan Steger, 650 Cragmont Ave., Berkeley, CA (US) 94708-1343; Cliff Avery Thomas, P.O. Box 18163, Palo Altos, CA (US) 94309-8163; Demetri Polychronis Spanos, 2815 Carnegie St., Houston, TX (US) 77005-3909; Nathan Christopher Lowry, 12 Brattle Dr., Apt. 7, Arlington, MA (US) 02474-2862; Betty Wingyi Seto, 13410 La Cresta Dr., Los Altos Hills, CA (US) 94022

( * ) Notice: Subject to any disclaimer, the term of this patent is extended or adjusted under 35 U.S.C. 154(b) by 107 days.

(21) Appl. No.: 10/272,846

(22) Filed: Oct. 17, 2002

(65) Prior Publication Data
US 2003/0089267 A1    May 15, 2003

Related U.S. Application Data

(60) Provisional application No. 60/329,862, filed on Oct. 17, 2001.

(51) Int. Cl.
*G01M 19/00* (2006.01)
(52) U.S. Cl. .................................... 73/865.8
(58) Field of Classification Search ............... 73/865.6; 104/138.1, 138.2
See application file for complete search history.

(56) References Cited

U.S. PATENT DOCUMENTS

| 3,764,806 | A | * | 10/1973 | Redmayne | .................. 378/60 |
| 3,890,905 | A |   | 6/1975  | Clavin   | ........................ 104/138 |
| 4,000,655 | A | * | 1/1977  | Jones    | ........................ 73/865.8 |
| 4,055,315 | A |   | 10/1977 | Gvelesiani et al. | ........... 243/33 |
| 4,170,902 | A |   | 10/1979 | Pallan   | ........................ 73/432 |

(Continued)

FOREIGN PATENT DOCUMENTS

WO    WO00/63606    10/2000

OTHER PUBLICATIONS

PCT International Search Report for PCT Application No. PCT/US02/33169 dated Mar. 6, 2003 (4 p.).

(Continued)

*Primary Examiner*—Charles Garber
(74) *Attorney, Agent, or Firm*—Conley Rose, P.C.

(57) ABSTRACT

The specification discloses a robot for inspection adapted to travel virtually unlimited distances through small-diameter enclosed spaces such as conduits or ducts, preferably using a fluid-driven screw-drive propulsion system. The robot preferably includes a drive module having a plurality of wheels inclined at an angle greater than zero degrees and less than ninety degrees to the longitudinal axis of the pipe, a driver module having a plurality of wheels aligned parallel to the longitudinal axis of the pipe, and a power module. The driver module is preferably connected to the drive module such that the drive and driver modules are capable of providing the locomotive motion of the robot. The power module preferably provides the power to the drive and driver modules.

49 Claims, 3 Drawing Sheets

U.S. PATENT DOCUMENTS

| | | | |
|---|---|---|---|
| 4,363,137 A | 12/1982 | Salisbury | 414/730 |
| 4,537,136 A * | 8/1985 | Douglas | 104/138.2 |
| 4,603,720 A * | 8/1986 | Jacoby | 152/209.17 |
| 4,677,865 A * | 7/1987 | Lehmann | 73/866.5 |
| 4,862,808 A | 9/1989 | Hedgcoxe et al. | 104/138.2 |
| 5,172,639 A | 12/1992 | Wiesman et al. | 104/138.2 |
| 5,392,715 A | 2/1995 | Pelrine | 104/138.2 |
| 5,551,349 A | 9/1996 | Bodzin | 104/138.2 |
| 5,565,633 A | 10/1996 | Wernicke | 18/865.8 |
| 5,571,977 A | 11/1996 | Kipp | 73/865.8 |
| 5,749,397 A | 5/1998 | Molaug | 138/89 |
| 5,773,984 A | 6/1998 | Suyama et al. | 324/635 |
| 5,878,783 A * | 3/1999 | Smart | 138/93 |
| 6,019,048 A | 2/2000 | Seeberger et al. | 104/138.2 |
| 6,031,371 A * | 2/2000 | Smart | 324/220 |
| 6,035,786 A | 3/2000 | McKay et al. | 104/138.2 |
| 6,087,830 A | 7/2000 | Brandly et al. | 324/220 |
| 6,107,795 A | 8/2000 | Smart | 324/220 |
| 6,123,027 A | 9/2000 | Suyama et al. | 104/138.2 |
| 6,162,171 A | 12/2000 | Ng et al. | 600/141 |
| 6,243,657 B1 | 6/2001 | Tuck et al. | 702/187 |
| 6,427,602 B1 | 8/2002 | Hovis et al. | 104/138.1 |
| 6,450,104 B1 | 9/2002 | Grant et al. | 107/138.2 |

OTHER PUBLICATIONS

Kumar et al.; *Robotic Corrosion Inspection Crawler*; Material Performance, Vo. 30, No. 4, pp. 29-32, 1991.

* cited by examiner

AUTONOMOUS ROBOTIC CRAWLER FOR IN-PIPE INSPECTION

CROSS-REFERENCE TO RELATED APPLICATIONS

This application claims the benefit of U.S. provisional patent application Ser. No. 60/329,862, filed Oct. 17, 2001, which is incorporated herein by reference in its entirety.

STATEMENT REGARDING FEDERALLY SPONSORED RESEARCH OR DEVELOPMENT

Not Applicable.

BACKGROUND OF THE INVENTION

1. Field of the Invention

The present invention generally relates to a robotic apparatus and, more particularly, to a robotic apparatus adapted to travel through enclosed spaces such as conduits or ducts using mechanically enabled helical-like motions.

2. Background of Relevant Art

Pipe crawlers, pipe inspection pigs and similar vehicles are widely used for inspecting the interior surfaces of piping systems, storage tanks, and process vessels for damaged or flawed structural features. Typically, such devices include a testing probe, sensor, or camera carried by a support structure that travels through the piping system being inspected.

Many of the remote inspection devices have been designed for pipes having a six-inch or greater inner diameter. However, there remains a need for the inspection of smaller diameter pipes, such as coiled steel tubing. In particular, there is a need for small-diameter inspection devices that are capable of travelling very long distances. For example, coiled steel tubing is often produced with lengths of 7,620 m (25,000 ft) at 32 mm (1.25 in) diameter or 1,800 m (6,000 ft) at 90 mm (3.5 in) diameter. Lengths of coiled tubing are stored on reels with diameters from 2 ft to 20 ft.

While current advances in miniaturization technology have made cameras and sensors small enough to fit within a small diameter pipe, there have been few advances in the design of a crawling apparatus having adequate motive forces to deploy a small diameter inspection apparatus through an extensive pipe system. For example, miniature electric motors do not provide enough motive force to pull extensive length tethers behind the crawler. Similarly, miniature air cylinders do not have the capacity to generate enough pushing force directly against the inner-walled pipe as is required for inch-worm motion. In addition, neither technology is capable of propelling an inspection devices of the mile-plus distances that may be required.

The art teaches a variety of larger-diameter pipe inspection apparatuses. One such apparatus is taught in U.S. Pat. No. 4,006,359 to Sullins et al. The crawler of Sullins et al. is a completely self-contained, self-propelled and self-operated vehicle adapted to travel through a pipeline, stop at particular locations such as a girth weld between adjoining sections of pipe, inspect the weld, for example by X-raying it and then proceed onto the next location to be inspected. While suitable for use in large diameter pipelines and traveling short distances, the crawler of Sullins et al. would not be feasible for use in coiled tubing for the following reasons. First, Sullins et al's crawler includes x-ray equipment (e.g. x-ray tube), which has not yet been fabricated to fit in small pipe diameters. Secondly, because x-ray equipment requires a large amount of power to operate, the size of the power source is dependent on the x-ray equipment, and thus greatly increased. Therefore, in addition to the x-ray equipment, the size of the power source may prohibit the crawler from traveling in small diameter spaces for long distances.

Another such apparatus is taught in U.S. Pat. No. 5,392,715 to Pelrine. Pelrine teaches an in-pipe running robot which does not easily turn over even when running round circumferentially inside piping. Still another such apparatus is taught in U.S. Pat. No. 4,862,808 to Hedgcoxe et al. Hedgcoxe et al. describes a robotic pipe crawling device having module pivot flexibility, which enables the device to negotiate corners with complete autonomy. However, there are limitations to the size and motive force capable of being exerted by these prior art devices as set forth above.

In particular, there is a need for a pipe inspection apparatus that will provide the necessary motive force for small diameter pipes. The apparatus should be dimensioned to pass through various sizes of piping and be able to readily negotiate bends in the piping. In addition, the pipe crawler should be autonomous and able to generate a sufficient motive force that can propel inspection equipment. Also, the pipe crawler should be capable of traveling in forward and backward directions, accelerating, decelerating, and stopping.

Thus, what is needed is a robotic apparatus that overcomes the deficiencies of the currently available technologies.

BRIEF SUMMARY OF THE INVENTION

The present invention overcomes the deficiencies of the prior art by providing a robotic apparatus adapted to travel through enclosed spaces such as conduits or ducts using a mechanical propulsion system.

In a preferred embodiment of the present invention, a robot for in-pipe inspection includes a drive module having a plurality of wheels inclined at an angle greater than zero degrees and less than ninety degrees to the longitudinal axis of the pipe, a driver module having a plurality of wheels aligned parallel to the longitudinal axis of the pipe, and a power module. The driver module is preferably connected to the drive module such that the drive and driver modules are capable of providing the locomotive motion of the robot. The power module preferably provides the power to the drive and driver modules. Various sources of power can be used with the present device. Particularly preferred is a turbine system that allows the device to be powered by the a flow of fluid, such as air, through the pipe or conduit.

The present device is capable of operating in a autonomous mode, wherein it derives power from the flow of fluid through the conduit and is capable of propelling itself in either the same or opposite direction as the fluid flow and at a speed that may vary from the fluid velocity, and a passive mode, in which the drive mechanism is inactivated and the device is carried by the fluid flow itself.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

In order to fully describe the embodiments of the present invention, reference will be made throughout this description to a longitudinal axis. The longitudinal axis is parallel to the axis of symmetry of the conduit or pipe through which the robot is traveling. It should be appreciated that the scope of the invention is only limited by the claims and not by this description.

Figure 1:
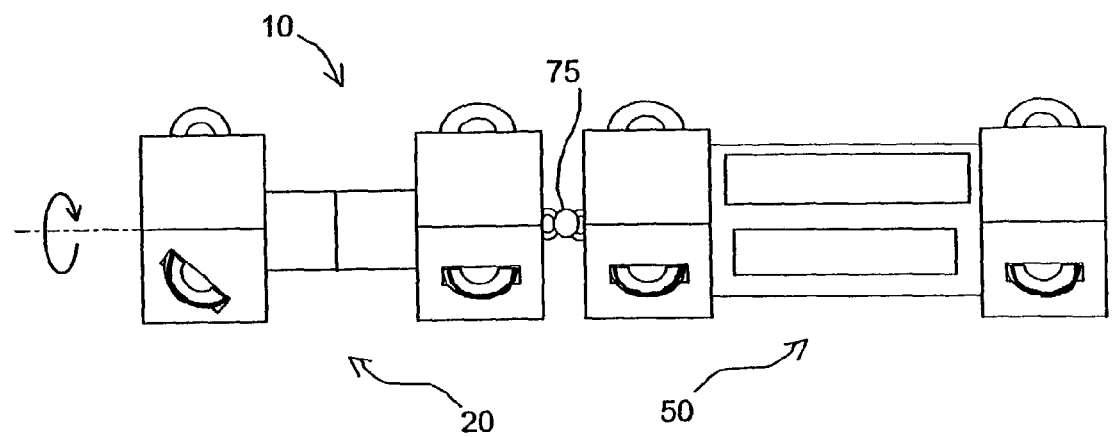
FIG. 1 is a schematic side view of a pipe-crawling robot in accordance with an embodiment of the present invention.
Figure 2:
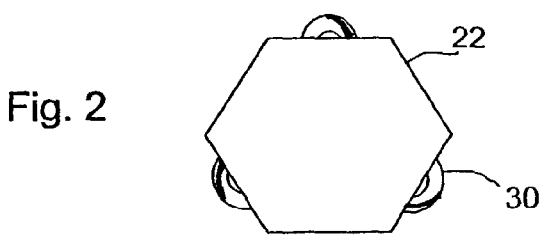
FIG. 2 is an end view of the device shown in FIG. 1.

Referring initially to FIGS. 1 and 2, the present invention provides a pipe-crawling robot 10. Robot 10 generally consists of at least two independently modular, articulated segments: first segment 20 and second segment 50. First segment 20 is preferably connected to second segment 50 by a flexible coupling 75. Flexible coupling 75 is free to bend about the longitudinal axis of robot 10, but prevents the relative rotation about the longitudinal axis. The combination of first segment 20 and second segment 50 provide the locomotive motion of robot 10, as will be described below in detail.

Figure 3:
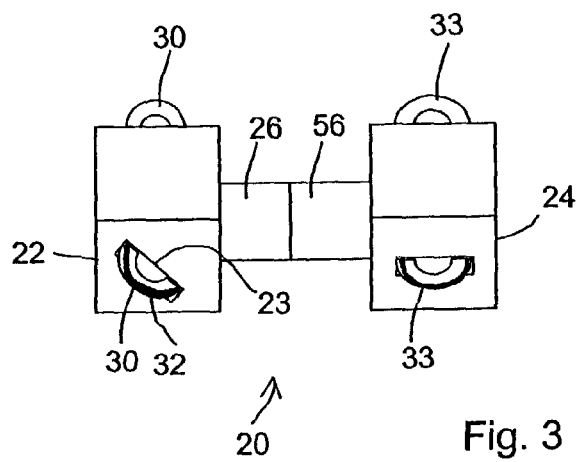
FIG. 3 is a schematic side view of a first segment of the robot shown in FIG. 1.

Referring now to FIG. 3, a more detailed depiction of first segment 20 is shown. First segment 20 preferably includes two end sections 22, 24, and a motor 56 disposed between end sections 22 and 24. End sections 22, 24 may house components such as sensor and tool components (not shown). In a preferred embodiment, a shaft 26 couples motor 56 to end section 24. Motor 56 is preferably an electric motor, such as a DC servomotor. In a preferred embodiment, shaft 26 engages end section 22 such that a when power is supplied to motor 56, motor 56 causes relative rotation between end sections 22 and 24.

In addition to housing components, at least one of end sections 22 and 24 serves as a platform for a plurality of pitched wheels 30, which are each supported on a suspension systems (not shown). Wheels 30 preferably include polymeric tires 32 and possess ball-bearing hubs (not shown). Pitched wheels 30 are preferably inclined at an angle greater than zero degrees and less than ninety degrees with respect to the longitudinal axis, producing at least one helical row of wheels 30 around first segment 20. The pitch of the wheels may be adjusted so that robot 10 travels at an acceptable speed, dependent on the environment of the conduit it is traveling in. For example, in smooth regions within the conduit, the pitch of the wheels 30 is preferably decreased so that robot 10 travels at a faster pace. Alternatively, in rough regions within the conduit, the pitch of the wheels 30 may be increased so that robot 10 travels at a slower pace.

In addition to pitch, the placement and number of wheels 30 may also be varied. In a preferred embodiment, end sections 22, 24 each include three wheels 30 located 120° apart from each other. As shown in the embodiment of FIG. 3, the wheels 33 on end section 24 are non-pitched.

Referring still to FIG. 3, the suspension systems are preferably spring-loaded cartridges 38, which are affixed in recesses 23 in end sections 22, 24. In an alternate embodiment, the suspension systems are cam-driven cartridges (not shown). The cams are preferably double-sided cams, which act against a follower mounted to each wheel support. A potential benefit of using cam-driven cartridges is that cam-driven cartridges may allow for longer travel and smaller friction force variation than spring-loaded cartridges.

In an alternate embodiment, paddles or sails (not shown) may be used in combination with or in place of drive wheels 30. When employing paddles or sails, air or liquid may be used to propel robot 10.

Figure 4:
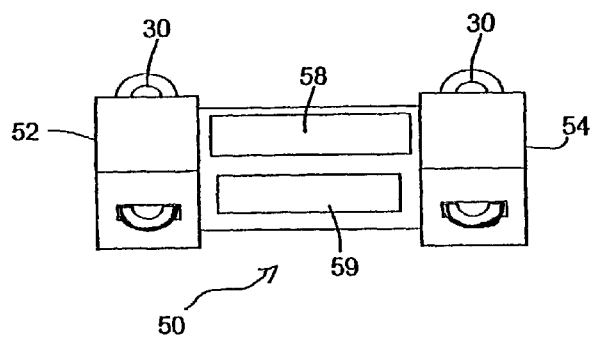
FIG. 4 is a schematic side view of a second segment of the robot shown in FIG. 1.

Referring now to FIG. 4, a more detailed depiction of second segment 50 is shown. Second segment 50 preferably includes end sections 52, 54, integrated circuit 58, and battery 59. Wiring/cables for sending information and/or power between components of robot 10 are preferably internal. For example, battery 59 provides electrical power to motor 56 (FIG. 1).

End sections 52, 54 preferably house various additional components such as sensor and tool components. End section 54 preferably also serves as a platform for a plurality of non-pitched wheels 33 and their associated suspension systems. Unlike the wheel arrangement on first segment 20, wheels 33 on second segment 50 are preferably aligned parallel to the longitudinal axis. Also, wheels 33 on at least one segment other than drive segment 20 preferably include an at least one optical encoder 31. Optical encoder 31 allows navigation software to track the wheel revolutions and the direction of travel to compute the distance robot 10 has traveled.

In a preferred embodiment, at least one of pitched wheels 30 is capable of being dynamically engaged and disengaged. Disengagement can occur either in response to a signal from outside the tool or in response to a sensing event. When wheels 30 on drive segment 20 are disengaged, end section 22 will rotate freely, without advancing the device within the conduit. In this configuration, robot 10 becomes to a passive device that is propelled through the conduit by the flow of gas or liquid in the conduit. Alternatively, non-pitched wheels 33 could be disengaged, but it would be necessary to disengage at least one wheel on each wheeled section so as to allow each section to move freely within the conduit.

Integrated circuit 58 preferably includes a master control unit 64, memory 66, a communications interface 68 and input/output (I/O) controls 70. In a preferred embodiment, master control unit 64 is a microprocessor (not shown). Memory 66 may include long-term memory and volatile memory components. In addition, software and databases may be located in memory 66. Communications interface 68 is preferably adapted to receive and/or transmit information to a remote location via light, remote control, air pulses, acoustic or radio frequency waves, etc. In a preferred embodiment, communications interface 68 is an antenna (not shown).

I/O controls 70 preferably include sensors (not shown) such as Hall effect sensors, ultrasonic sensors, acoustic sensors, visual and optical inspection sensors, radiographic sensors, magnetic particle sensors, magnetic field sensors, electrical and eddy current sensors, penetrant sensors, pressure sensors, chemical sensors, leak sensors, microwave sensors, pressure and flow sensors, and thermal sensors, etc. I/O controls 70 may also include tools (not shown) such as repair and servicing tools, hardness testing tools, sample collection tools, etc. Further, I/O controls 70 preferably include actuators for motor control and navigation.

In integrated circuit 58, master control unit 64 communicates with memory 66 to access information from I/O controls 70 and then stores the information in memory 66. In some embodiments, master control unit 64 communicates with communications interface 68 to access information from I/O controls 70 and then stores the information in memory 66. Master control unit 64 can also send information to I/O controls 70.

Figure 5:
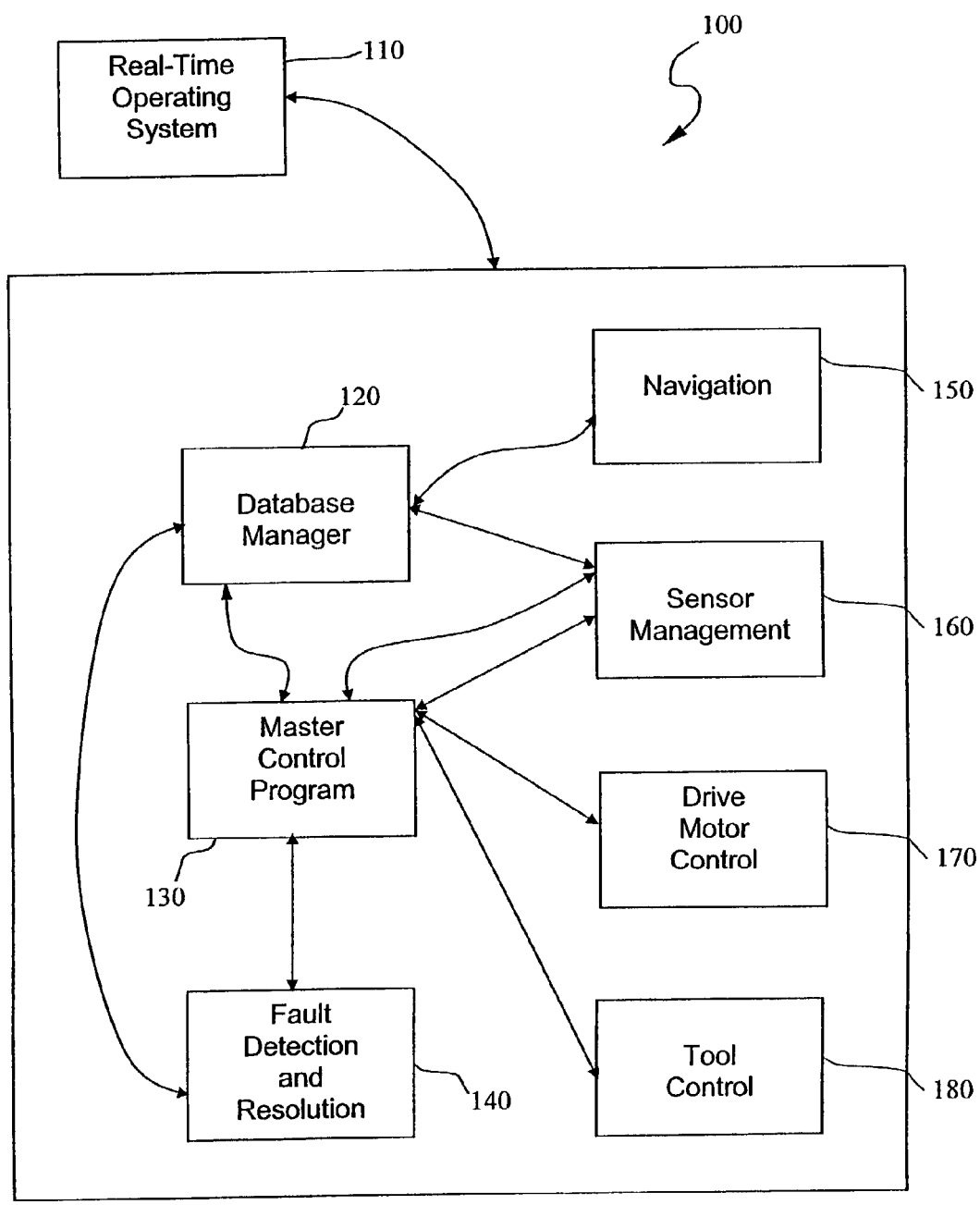
FIG. 5 is a block diagram of software architecture in accordance with an embodiment of the present invention.

Referring now to FIG. 5, a block diagram 100 of the software architecture in an embodiment of the present invention is shown. Block diagram 100 includes real-time operating system 110, a database manager module 120, a master control program module 130, a fault detection and resolution module 140, a navigation module 150, a sensor management module 160, a drive motor control module 170, and a tool control module 180. Real-time operating system 110 creates the environment for the rest of the modules to operate.

Database manager module 120 maintains and organizes the information or data in a database. Database manager module 120 communicates with navigation module 150, sensor management module 160, master control program module 130, and fault detection and resolution module 140. In a preferred embodiment, database manager module 120 receives and stores time-tagged information from navigation module 150 and sensor management module 160. Database manager module 120 is also capable of recording significant events.

Master control program module 130 is the intelligence of robot 10. Master control program module 130 communicates with database manager module 120, sensor management module 160, drive motor control module 170, tool control module 180, and fault detection and resolution module 140. In a preferred embodiment, master control program module 130 schedules sensor and tool commands, which are implemented in sensor management module 160 and tool control module 180, respectively. Master control program 130 also obtains location and sensor information from a database.

Fault detection and resolution module 140 preferably detects if a fault has occurred, whether the fault is software or hardware related, and how to correct the fault. Fault detection and resolution module 140 communicates with master control program module 130 and database manager module 120. In a preferred embodiment, fault detection and resolution module 140 tests for locomotion failures and disengages wheels 30 and/or wheels 33 as necessary. As discussed above, when wheels 30 on drive segment 20 are disengaged, robot 10 reverts to a passive device propelled through the conduit by flowing gas or liquid. Fault detection and resolution module 140 may also test for and correct sensor, navigation, and tool failures.

Navigation module 150 records the along-track position of the wheel-mounted optical encoder 31, time tags the information, and stores in it a database. Navigation module 150 communicates with database manager module 120.

Sensor management module 160 collects information from and controls various sensors. Sensor management module 160 communicates with database manager module 120 and master control program module 130. In a preferred embodiment, sensor management module 160 performs real-time information processing and stores reduced, time-tagged information in a database.

Drive motor control module 170 controls electric motor 62. Drive motor control module 170 communicates with master control program module 130. Drive motor control module 170 preferably receives and responds to commands from master control program module 130. In a preferred embodiment, drive motor control module 170 sends information to electric motor 62 in the form of pulse-width modulated signals.

Tool control module 180 controls various tools. Tool control module 180 communicates with master control program module 130. Tool control module 180 preferably receives and responds to commands from master control program module 130. In a preferred embodiment, tool control module 180 generates tool-specific command signals.

Figure 6:
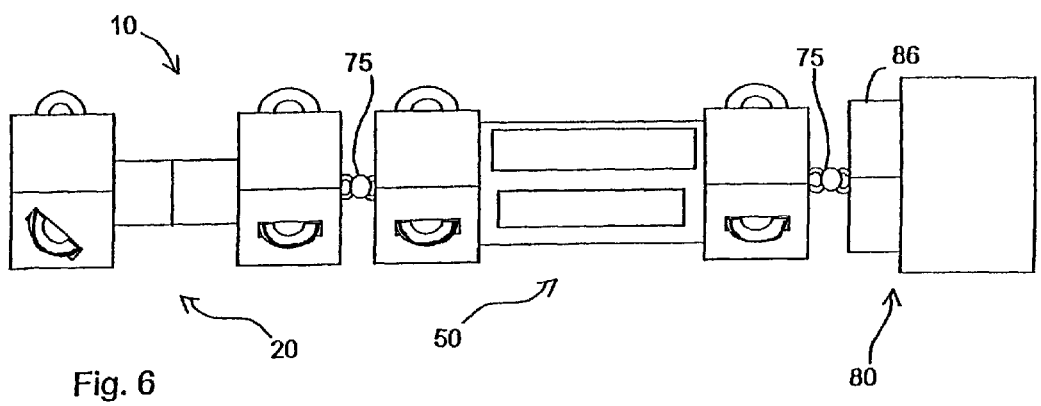
FIG. 6 is a schematic side view of a pipe-crawling robot in accordance with an alternate embodiment of the present invention.

Pipe-crawling robot 10 preferably also includes a power system. Referring now to FIG. 6, an alternative embodiment of the robot includes a third segment 80. Segment 80 preferably includes a power supply, and is preferably an electric power module. In a preferred embodiment, power provided by segment 80 continuously or intermittently charges battery 59 on segment 50. Second segment 50 is preferably connected to third segment 80 by a second flexible coupling 75.

Similar to flexible coupling 75, flexible coupling 105 is free to bend about the longitudinal axis of robot 10, but prevents the relative rotation about the longitudinal axis. Flexible couplings 75, 105 are preferably capable of detaching from segments 20, 50, and 80. Also, additional flexible couplings (not shown) may be attached to segments 20, 50, and 80. The use of flexible couplings allows robot 10 to reduce or increase its number of segments, which may prove useful for unloading payloads, recovering payloads, etc., in a conduit.

Figure 7:
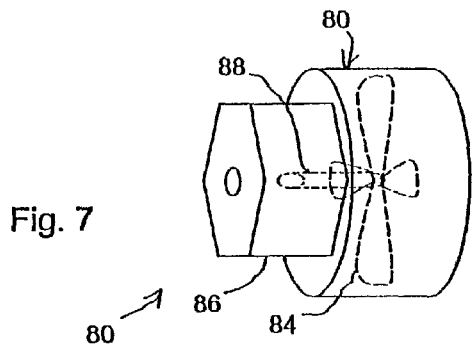
FIG. 7 is a schematic perspective view of one portion of the third segment of the robot shown in FIG. 6.

Referring now to FIG. 7, a more detailed depiction of third segment 80 is shown. In a preferred embodiment, third segment 80 includes a turbine-based power supply system 82. Turbine system 82 preferably includes a turbine or fan 84 (shown in phantom), a motor/generator 86, and a shaft 88 (shown in phantom) disposed between fan 84 and motor/generator 86. For purposes of the present invention, any mechanical device capable of extracting mechanical energy from a fluid flow, include one or more turbines, fans, paddles, and the like, can be used in turbine system 82. For ease of reference, the term "fan 84" will be used to refer to all such devices. Turbine system 82 is preferably driven by air blown through the conduit (not shown), but may alternatively be powered by any fluid flow. Mechanical power extracted from the fluid flow as it spins the turbine is converted into electrical power by generator 86. This power can be transmitted directly to motor 56 (FIG. 1) so as to propel the robot, or it can be stored in battery 59, or any combination of these. For example, the control system may sense when battery power is low and direct power to the battery in order to recharge it. An advantage of turbine system 82 is that it permits a virtually unlimited supply of electrical power without a practical limit on the distance robot 10 may travel in a conduit.

In an alternate embodiment, third segment 80 includes a battery system (not shown). In yet another alternate embodiment, third segment 80 includes a power tether (not shown). Battery systems and power tethers are desirable for use in applications of limited distance and involving relatively straight conduits.

Operation of Power System

Compressed air or inert gas is caused to flow through the conduit. This may be accomplished by the use of an air compressor or bottled compressed gas. The flowing gas turns the blades of fan 84, which spin turbine shaft 88. Turbine shaft 88 connects to electric generator 86, which produces electricity (electric current). As discussed above, the electrical current is preferably used to recharge an onboard battery 59, which provides power to drive the wheels 30. Electric generator 86 also preferably provides power to integrated circuit 58, sensors (not shown), and electric motor 62.

Operation of Drive and Driver Segments

When instructed to turn on, shaft 26 of electric motor 56 causes end section 22 of first segment 20 to rotate about the longitudinal axis. This is accomplished because the longitudinally aligned wheels in end section 24 and second segment 50 resist the tendency of end section 24 and second segment 50 to rotate, thus the motor 56 torque causes end section 22 of first segment 20 to rotate.

For example, if shaft 26 and end section 22 are rotating in the clockwise direction (as viewed from the device), robot 10 is pulled in the forward direction. This is because the inclined wheels 30 on first segment 20 have the effect of screw threads, and thus the rotational motion of first segment 20 is transformed into longitudinal motion of robot 10.

In order to reverse the direction of travel, shaft 26 of motor 56 is instructed to rotate in the opposite direction, i.e. counterclockwise. This causes end section 22 to rotate counterclockwise, and subsequently push robot 10 in the reverse direction.

In some embodiments, the speed at which shaft 26 rotates can be adjusted by motor 56, causing robot 10 to accelerate or decelerate. When it is desirable for robot 10 to stop, motor 56 ceases movement of shaft 26.

As stated above, in a preferred embodiment, the suspension system that supports each wheel is preferably a spring-loaded cartridge. Each spring-loaded cartridge includes a spring-loaded piston to which the wheels 30 are mounted. The spring-loaded piston 37 urges the wheel 30 outwardly so that the wheel can engage the conduit wall (not shown), which in turn induces sufficient friction to prevent slipping. When the suspension systems are cam-driven cartridges, the rotation of the cam induces a normal force between the wheel 30 and the conduit wall (not shown), again inducing sufficient friction to prevent slipping.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

For example, while the present invention has been described having two or three separate modules or segments, it has been appreciated that any number or modules may be used. Likewise, the order and positioning of the segments in the device may be varied. Connected components may be connected either directly or indirectly. The use of additional modules may serve to house additional sensor or power equipment or carry various payloads. In some embodiments, the additional modules may be specialized for specific sensors. Furthermore, where the amount of data to be stored is excessive, it may be desirable to include multiple memory modules. Similarly, the position, numbering and configuration of pitched and non-pitched wheels can be varied without altering the basic operation of the device.

What is claimed is:

1. An autonomous robot for traversing a conduit comprising:
    a body;
    a drive system capable of extracting energy from a flow of fluid through the conduit and using the energy to advance the body along the inside of the conduit; and
    at least one sensor mounted on said body;
    wherein the drive system includes at least one set of pitched wheels and at least one set of non-pitched wheels;
    wherein at least one of said wheels is supported on a suspension system and said suspension system is actuatable between a first position in which all of said pitched wheels contact said conduit and a second position in which at least one of said pitched wheels is retracted such that the section on which said retracted wheel is mounted can rotate freely within the conduit; and
    wherein at least one of said wheels can be retracted by the robot in the event of a locomotion failure.

2. The robot according to claim 1 wherein said robot includes at least first and second portions connected via a flexible coupling.

3. The robot according to claim 1 wherein said body comprises:
    a first end section;
    a second end section; and
    a motor;
    wherein said motor is disposed between said end sections.

4. The robot according to claim 3, further including a rotatable shaft connecting at least one of said end sections to said motor.

5. The robot according to claim 4 wherein said motor receives power from said power module.

6. The robot according to claim 5 wherein said motor rotates said shaft, causing said first end section to rotate relative to said second end section.

7. The robot according to claim 3 wherein said pitched wheels are located on at least one of said first and second end sections.

8. The robot according to claim 7 wherein the pitch of the wheels is variable.

9. The robot according to claim 7 wherein each of said end sections supports three wheels located 120° apart about the circumference of said end section.

10. The robot according to claim 1, further comprising a suspension system supporting at least one of said wheels.

11. The robot according to claim 10, wherein at least one suspension system is actuatable between a first position in which all of said pitched wheels contact said conduit and a second position in which at least one of said pitched wheels is retracted.

12. The robot according to claim 1 wherein said wheels comprise polymeric tires having ball bearing hubs.

13. The robot according to claim 1, wherein said drive system includes paddles or sails for deriving power from a fluid flow past the robot.

14. The robot according to claim 13 wherein the power generated by said paddles or sails is stored in a battery prior to use.

15. The robot according to claim 1 further comprising at least one optical encoder located on one of said wheels.

16. The robot according to claim 15 wherein said optical encoder tracks distance traveled.

17. The robot according to claim 1 wherein said body includes:
an integrated circuit supported on said body; and
a battery supported on said body.

18. The robot according to claim 17 wherein said integrated circuit comprises:
a master control unit;
memory;
a communications interface; and
a plurality of input/output controls.

19. The robot according to claim 18 wherein said master control unit is a microprocessor that executes an operating system.

20. The robot according to claim 19 wherein said memory comprises long-term and volatile components.

21. The robot according to claim 20 wherein said memory further comprises software and databases.

22. The robot according to claim 19 wherein said memory includes at least one software module selected from the group consisting of database managers, master control programs, fault detection and resolution modules, navigation modules, sensor management modules, drive motor control modules, and tool control modules, and said operating system communicates with at least one of said software modules.

23. The robot according to claim 22 wherein said memory includes a fault detection and resolution module that is capable of testing for locomotion failures and actuating an extension or a retraction of said wheels on said drive segment.

24. The robot according to claim 22 wherein the robot further includes an optical encoder and said navigation module records data provided by said optical encoder.

25. The robot according to claim 24 wherein said navigation module further time tags the optical encoder information.

26. The robot according to claim 25 wherein said sensor management model performs real-time sensing information processing.

27. The robot according to claim 26 wherein said sensor management model further reduces and time tags the sensing information.

28. The robot according to claim 18 wherein said communications interface is adapted to receive information from and transmit information to a remote location.

29. The robot according to claim 28 wherein said communications interface is adapted to receive and transmit information via light, remote control, air pulses, fluid pulses, acoustic frequency waves, radio frequency waves, or a combination thereof.

30. The robot according to claim 28 wherein said communications interface is an antenna.

31. The robot according to claim 28 wherein said input/output controls comprise a plurality of sensors, tools, actuators, or a combination thereof.

32. The robot according to claim 31 wherein said sensors are selected from the group consisting of Hall effect sensors, ultrasonic sensors, acoustic sensors, visual and optical inspection sensors, radiographic sensors, magnetic particle sensors, magnetic field sensors, electrical and eddy current sensors, penetrant sensors, pressure sensors, chemical sensors, leak sensors, microwave sensors, pressure and flow sensors, and thermal sensors.

33. The robot according to claim 31 wherein said tools are selected from the group consisting of repair tools, servicing tools, hardness, testing tools, and sample collection tools.

34. The robot according to claim 31 wherein said actuators are selected from the group consisting of motor control and navigation actuators.

35. The robot according to claim 17 wherein said drive system charges said battery.

36. The robot according to claim 1 wherein said drive system includes a power tether.

37. The robot according to claim 1 wherein said drive system includes a battery.

38. The robot according to claim 1 wherein said drive system includes a turbine system.

39. The robot according to claim 38 wherein said turbine system comprises:
a fan;
a generator; and
a shaft disposed between the generator and shaft for transmitting torque from the fan to the generator.

40. The robot according to claim 38 wherein said turbine system is driven by fluid flowing in the conduit.

41. The robot according to claim 38 wherein said turbine system is driven by compressed air or inert gas.

42. The robot according to claim 1 wherein the robot further comprises at least one additional module.

43. The robot according to claim 42 wherein said additional module is selected from the group consisting of payload, sensor, power equipment, and memory modules.

44. The robot according to claim 1 wherein the drive system includes a power module comprising a fan, a generator, and a shaft disposed between said generator and said fan.

45. The robot device according to claim 1 wherein at least one of said wheels can be extended and retracted in response to commands sent by said integrated circuit to said locomotive modules, such that the robotic device is capable of operating in an active mode in which said at least one wheel engages the conduit and is driven by power from said power module so as to propel the device and a passive mode in which said at least one wheel does not propel the device.

46. An autonomous robot for traversing a conduit comprising:
a drive module having a plurality of pitched wheels, said pitched wheels being oriented such that each of their axes defines a pitch angle greater than zero degrees and less than ninety degrees with respect to the longitudinal axis of the conduit, said pitched wheels lying in at least one helical row;
a driver module connected to said drive module, said driver module having a plurality of wheels aligned parallel to the longitudinal axis of the conduit; and
a power module;
wherein said drive and driver modules cooperate to provide locomotive motion of the robot, and wherein said power module provides power for said locomotive motion,
further comprising a suspension system supporting at least one of said wheels, wherein at least one suspension system is actuatable between a first position in which all of said pitched wheels contact said conduit and a second position in which at least one of said pitched wheels is retracted such that the section on which said retracted wheel is mounted can rotate freely within the conduit, and wherein said suspension system comprises cam-driven cartridges.

47. An autonomous robot for traversing a conduit comprising:
a drive module having a plurality of pitched wheels, said pitched wheels being oriented such that each of their axes defines a pitch angle greater than zero degrees and less than ninety degrees with respect to the longitudinal axis of the conduit;

a driver module connected to said drive module, said driver module having a plurality of wheels aligned parallel to the longitudinal axis of the conduit; and a power module, said power module comprising a turbine system;

wherein said drive and driver modules provide locomotive motion of the robot, and wherein said power module provides the power for said locomotive motion;

wherein said turbine system is capable of producing power regardless of the direction in which fluid is flowing through the conduit; and wherein at least one of said wheels is supported on a suspension system and said suspension system is actuatable between a first position in which all of said pitched wheels contact said conduit and a second position in which at least one of said pitched wheels is retracted such that the section on which said retracted wheel is mounted can rotate freely within the conduit.

48. The robot according to claim 47 wherein the robot is no more than six inches in diameter.

49. An autonomous robot for traversing a conduit comprising:

a drive module having a plurality of pitched wheels, said pitched wheels being oriented such that each of their axes defines a pitch angle greater than zero degrees and less than ninety degrees with respect to the longitudinal axis of the conduit;

a driver module rotatably connected to said drive module, said driver module having a plurality of wheels aligned parallel to the longitudinal axis of the conduit;

a power module for providing power to cause rotation of said drive module relative to said driver module; and a suspension system supporting at least one of said wheels, said suspension system comprising at least one cam-driven cartridge, wherein said suspension system is actuatable between a first position in which all of said pitched wheels contact said conduit and a second position in which at least one of said pitched wheels is retracted such that the section on which said retracted wheel is mounted can rotate freely within the conduit.

* * * * *